United States Patent
Muñiz Casais et al.

(10) Patent No.: US 9,705,371 B2
(45) Date of Patent: Jul. 11, 2017

(54) GENERATOR

(71) Applicant: Alstom Renovables España, S.L., Barcelona (ES)

(72) Inventors: César Muñiz Casais, Taradell (ES); Thomas Klamt, Birr (CH); Rafael Anderes, Birr (CH)

(73) Assignee: ALSTOM Renewable Technologies, Grenoble (FR)

( * ) Notice: Subject to any disclaimer, the term of this patent is extended or adjusted under 35 U.S.C. 154(b) by 269 days.

(21) Appl. No.: 13/763,474

(22) Filed: Feb. 8, 2013

(65) Prior Publication Data

US 2013/0214632 A1    Aug. 22, 2013

Related U.S. Application Data

(60) Provisional application No. 61/636,463, filed on Apr. 20, 2012.

(30) Foreign Application Priority Data

Feb. 20, 2012    (EP) ..................................... 12382053

(51) Int. Cl.
    *H02K 3/28* (2006.01)
    *H02K 3/18* (2006.01)

(52) U.S. Cl.
    CPC ............... *H02K 3/28* (2013.01); *H02K 3/18* (2013.01); *Y02E 10/725* (2013.01)

(58) Field of Classification Search
    CPC ................................................ H02K 3/28
    USPC .................................. 310/179, 180, 184, 208
    See application file for complete search history.

(56) References Cited

U.S. PATENT DOCUMENTS

| | | | | |
|---|---|---|---|---|
| 3,774,062 | A * | 11/1973 | Johnson | 310/184 |
| 4,045,718 | A * | 8/1977 | Gray | 320/123 |
| 4,048,713 | A * | 9/1977 | Hvass | 29/594 |
| 4,107,583 | A * | 8/1978 | Houtman | 318/781 |
| 6,281,612 | B1 * | 8/2001 | Asao et al. | 310/179 |
| 7,005,772 | B1 * | 2/2006 | Frederick et al. | 310/179 |

(Continued)

FOREIGN PATENT DOCUMENTS

| | | |
|---|---|---|
| EP | 2 362 526 | 8/2011 |
| GB | 215 335 | 9/1925 |

(Continued)

OTHER PUBLICATIONS

(JPO machine translation of JP 2004208464 A): Yonekura, Stator coil arrangement of permanent magnet type motor, comprises mutually insulated conducting wires arranged in parallel at the coil surface side of teeth of stator core, Jul. 22, 2004, All pages.*

(Continued)

*Primary Examiner* — Naishadh Desai
(74) *Attorney, Agent, or Firm* — Dority & Manning, P.A.

(57) ABSTRACT

The present invention provides a generator comprising winding arrangements, each winding arrangement comprising at least an inner coil and an outer coil constituting a concentric structure of coils. The inner coil is constituted by an inner conductor and the outer coil is constituted by an outer conductor, the inner and outer conductors being connected in series. The inner conductor, which is wound around a tooth, has a smaller electrical resistance per unit length than the outer conductor.

17 Claims, 3 Drawing Sheets

(56) References Cited

U.S. PATENT DOCUMENTS

| | | | |
|---|---|---|---|
| 7,096,566 B2* | 8/2006 | Du et al. .......................... | 29/596 |
| 8,575,809 B2* | 11/2013 | Stiesdal ........................ | 310/180 |
| 2001/0011851 A1* | 8/2001 | Asao et al. .................. | 310/179 |
| 2004/0207283 A1* | 10/2004 | Oohashi et al. .............. | 310/207 |
| 2007/0089284 A1* | 4/2007 | Bullock et al. ................ | 29/596 |
| 2007/0247014 A1* | 10/2007 | Schach et al. ................ | 310/184 |
| 2009/0102309 A1* | 4/2009 | Kamibayashi et al. ...... | 310/195 |
| 2010/0033052 A1* | 2/2010 | Wolf ............................ | 310/207 |
| 2011/0050025 A1* | 3/2011 | Doushita ................ | H02K 1/146 |
| | | | 310/198 |
| 2011/0210558 A1* | 9/2011 | Stiesdal ........................ | 290/55 |

FOREIGN PATENT DOCUMENTS

| | | | | |
|---|---|---|---|---|
| GB | 2232305 A | * | 12/1990 | .............. H02K 3/18 |
| JP | 2002-223542 | | 8/2002 | |
| JP | 2004-208464 | | 7/2004 | |
| JP | 2004208464 A | * | 7/2004 | |
| JP | 2007336780 A | * | 12/2007 | |

OTHER PUBLICATIONS

European Search Report for EP 12382053, mailed Aug. 23, 2012, 4 pgs.

* cited by examiner

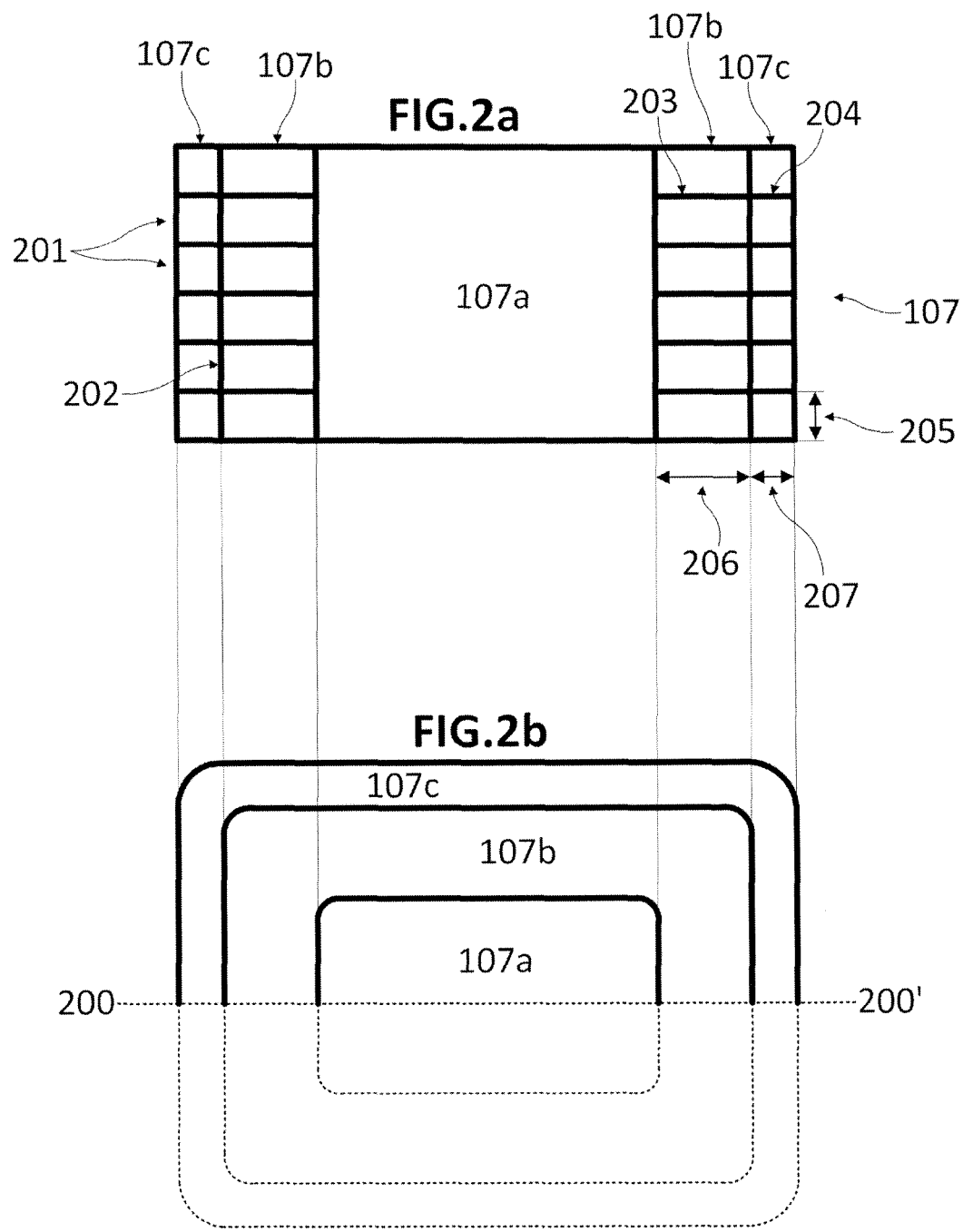

GENERATOR

This application claims the benefit of European Patent Application EP 12382053.2 filed Feb. 20, 2012 and U.S. Provisional Patent Application Ser. No. 61/636,463 filed Apr. 20, 2012. The disclosures of both these applications are hereby incorporated by reference in their entirety for all purposes.

The present invention relates to a generator comprising winding arrangements, each winding arrangement comprising at least an inner coil and an outer coil constituting a concentric structure of coils.

BACKGROUND ART

A generator is a device capable of transforming mechanical energy into electricity. This transformation is achieved by the action of a magnetic field on electrical conductors. If a relative movement between the conductors and the magnetic field is produced, an electromotive force is generated in the conductors.

The abovementioned electrical conductors usually consist of winding arrangements and the magnetic field may generally be produced by electromagnets or permanent magnets. The electromagnets may also comprise winding arrangements, which may be supplied with suitable power to generate the magnetic field. For reasons of homogeneity of terms, the winding arrangements having the role of generating the magnetic field will be referred herein as "magnetic field winding arrangements", and the winding arrangements in which an electromotive force is induced by the action of the magnetic field will be referred herein as "power producing winding arrangements".

In order to achieve relative movement between the power producing and the magnetic field winding arrangements, rotation of the power producing winding arrangements, or rotation of the magnetic field winding arrangements, or rotation of both may be caused. Such a rotation may be achieved by operationally connecting the corresponding winding arrangements with e.g. a turbine comprising blades. The rotation of the turbine may be caused e.g. by the wind or a waterfall or steam acting on the blades. This steam may be produced e.g. from an energy source which may be fossil or nuclear fuel.

In some known generators, each of the power producing winding arrangements and/or the magnetic field winding arrangements comprises at least an inner coil and an outer coil constituting a concentric structure of coils. The inner coil is constituted by a determined number of layers of an inner conductor and, equivalently, the outer coil is constituted by a determined number of layers of an outer conductor, the inner conductor being wound around a tooth. This concentric structure permits increasing the number of layers of the winding arrangements in comparison with winding arrangements based on a single coil with a determined number of conductor layers.

In the case of magnetic field winding arrangements, a higher number of conductor layers permits generating a higher magnetic field, whereas in the case of power producing winding arrangements, a higher number of conductor layers allows induction of a higher voltage.

In operation, the current passing through the coils causes the winding arrangements to heat up. Overheating of the conductors may damage the generator and/or decrease its performance.

SUMMARY OF THE INVENTION

There thus still exists a need for new generators that resolve the above mentioned problem. It is an object of the present invention to fulfil such a need.

The present invention provides a generator comprising winding arrangements, each winding arrangement comprising at least an inner coil and an outer coil constituting a concentric structure of coils. The inner coil is constituted by an inner conductor and the outer coil is constituted by an outer conductor, the inner and outer conductors being connected in series. The inner conductor, which is wound around a tooth, has a smaller electrical resistance per unit length than the outer conductor.

The connection in series of the inner conductor and the outer conductor may be achieved by constructing the concentric structure of coils from a single conductor. This single conductor may have a first region and a second region, the first region (inner conductor) having a smaller electrical resistance per unit length than the second region (outer conductor). Alternatively to having a single conductor, the concentric structure of coils may be constructed by e.g. suitably brazing two separate coils (i.e. two separate conductors). One of said separate conductors (inner conductor) having a smaller electrical resistance per unit length than the other of said separate conductors (outer conductor).

In this generator, the proposed winding arrangements offer an improved thermal behaviour during operation, such that the risk of overheating is reduced. The inner coil is stuck between the tooth and the outer coil, whereas the outer coil may be exposed to air flows caused by the operation of the generator, which may comprise e.g. an especially dedicated ventilation system. These air flows may refrigerate in some way the outer coils but not the inner coils. A way of compensating this lack of refrigeration of the inner coils may be to reduce the electric resistance per unit length of the inner conductors with respect to the outer conductors.

This way, the inner conductor will develop less heat than the outer conductor under identical operational conditions. Nevertheless, the abovementioned air flows may compensate this differential heating of the outer conductor with respect to the inner conductor. Therefore, a proper ratio of the electric resistance per unit length of the inner conductor to the electric resistance per unit length of the outer conductor may improve the thermal behaviour of the winding arrangements of the generator.

In some embodiments, the lower electric resistance per unit length of the inner conductor with respect to the outer conductor may be achieved by attributing to the inner conductor a cross-section larger than the cross-section of the outer conductor. Alternatively to these embodiments, the lower electric resistance per unit length of the inner conductor with respect to the outer conductor may be achieved by attributing different electrical conductivities to the inner and outer conductors. According to this last principle, the inner conductor may be made of a material having a greater electrical conductivity than the material of the outer conductor.

Alternatively to the embodiments of the previous paragraph, the lower electric resistance per unit length of the inner conductor with respect to the outer conductor may be achieved by attributing to the inner conductor both a greater cross-section and a greater electrical conductivity with respect to the outer conductor.

Additional objects, advantages and features of embodiments of the invention will become apparent to those skilled in the art upon examination of the description, or may be learned by practice of the invention.

BRIEF DESCRIPTION OF THE DRAWINGS

Particular embodiments of the present invention will be described in the following by way of non-limiting examples, with reference to the appended drawings, in which:

FIG. 2a shows an enlarged view of one of the two winding arrangements of FIG. 1b;

FIG. 2b shows a top view of the winding arrangement of FIG. 2a; and

DETAILED DESCRIPTION OF EMBODIMENTS OF THE INVENTION

In the following description, numerous specific details are set forth in order to provide a thorough understanding of the present invention. It will be understood by one skilled in the art however, that the present invention may be practiced without some or all of these specific details. In other instances, well known elements have not been described in detail in order not to unnecessarily obscure the description of the present invention.

Figure 1A:
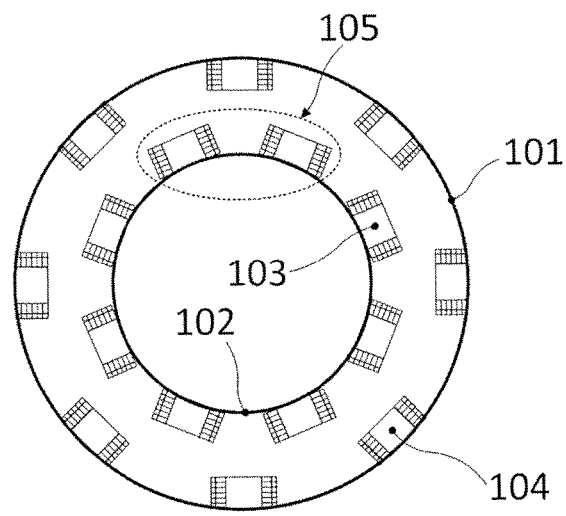
FIG. 1a is a schematic representation of a generator comprising winding arrangements according to embodiments of the invention.

FIG. 1a is a schematic representation of a generator comprising winding arrangements according to embodiments of the invention. This figure shows an outer structure 101 that comprises a plurality of winding arrangements 104, and an inner structure 102 that comprises a plurality of winding arrangements 103. The inner structure 102 may be a rotor of the generator and the outer structure 101 a stator of the generator, or, alternatively, the inner structure 102 may be a stator of the generator and the outer structure 101 a rotor of the generator.

The rotor may be operatively connected with a shaft of e.g. a wind turbine or a steam turbine.

The winding arrangements 103 of the inner structure 102 may be magnetic field winding arrangements, and the winding arrangements 104 of the outer structure 101 may be power producing winding arrangements. Or, alternatively, the winding arrangements 103 of the inner structure 102 may be power producing winding arrangements, and the winding arrangements 104 of the outer structure 101 may be magnetic field winding arrangements.

In some embodiments, the generator may be based on permanent magnets instead of on magnetic field winding arrangements. In this case, the generator only has winding arrangements of the type described herein as power producing winding arrangements. In other embodiments, the magnetic field may be generated in the generator by a combination of permanent magnets and magnetic field winding arrangements, said winding arrangements also having the concentric structure explained before.

Figure 1B:
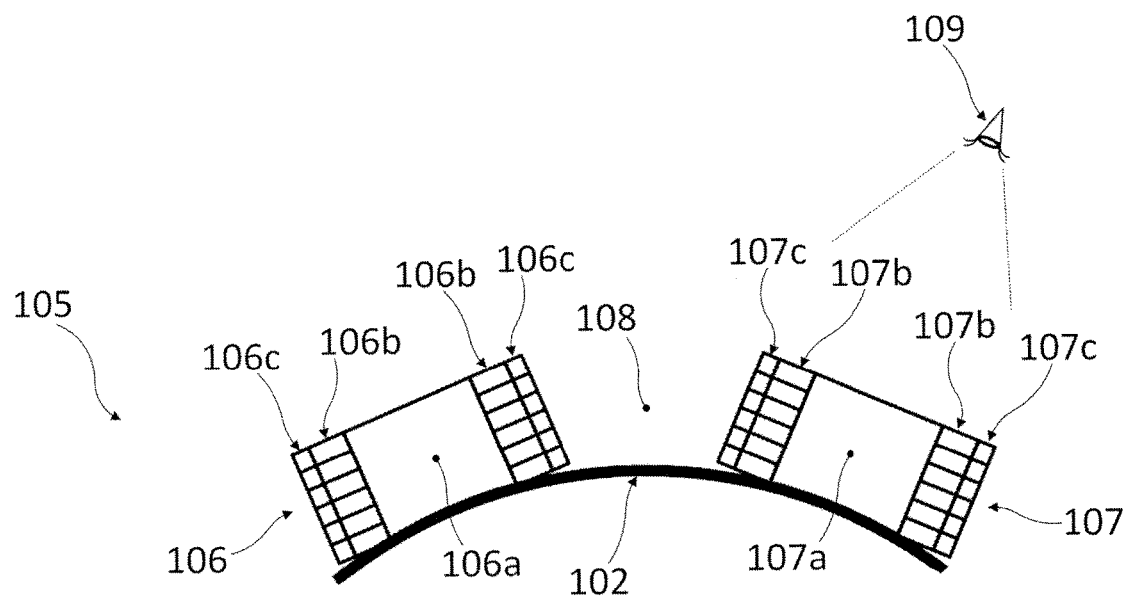
FIG. 1b shows an enlarged view of a section of the generator of FIG. 1a comprising two winding arrangements.

FIG. 1b shows an enlarged view of a section 105 of the generator of FIG. 1a, said section 105 comprising a pair of neighbouring winding arrangements. FIG. 1b may represent e.g. a rotor with salient poles, i.e. a rotor structure comprising a plurality of teeth on its outer perimeter, around which the coils are arranged.

This pair of neighbouring winding arrangements comprises a first winding arrangement 106 and a second winding arrangement 107. The first winding arrangement 106 comprises an inner coil 106b and an outer coil 106c constituting a concentric structure of coils. The inner coil 106b is constituted by an inner conductor and the outer coil 106c is constituted by an outer conductor, the inner conductor being wound around a tooth 106a, and the inner and outer conductors being connected in series. Furthermore, the inner conductor has a larger cross-section than the outer conductor.

The inner and outer conductors may be e.g. a copper wire or copper sheet metal. Different materials such as e.g. aluminium could also be used.

Alternatively to having different cross-sections, the inner and outer conductors may be made of different materials in such a way that the inner conductor presents an electrical conductivity greater than the electrical conductivity of the outer conductor. For instance, the inner conductor may be made of copper and the outer conductor may be may be made of aluminium. In another example according to the same principle, the inner conductor may be made of a superconductor and the outer conductor may be made of copper.

Alternatively to having different cross-sections and to having different conductivities, suitable combinations of both parameters may be considered when designing the inner and the outer coils. These embodiments based on combining different cross-sections and conductivities may permit to obtain the same or similar thermal behaviour for the winding arrangements.

Alternatively to having different coils connected in series, the inner coil 106b and the outer coil 106c may be different regions of a single winding constituting the concentric structure of coils. This single winding may be constructed in such a way that the region corresponding to the inner coil 106b may have a greater cross-section and/or a greater conductivity than the region corresponding to the outer coil 106c.

The second winding arrangement 107 has a substantially identical structure as the first winding arrangement 106, as may be derived from the figure itself. It may be seen in FIG. 1b that there is a gap 108 between the first winding arrangement 106 and the second winding arrangement 107. More specifically, this gap 108 is partially delimited by an area of the outer coil 106c of the first winding arrangement 106 and an area of the outer coil 107c of the second winding arrangement 107. It will be clear that in practice the gap between the winding arrangements 106 and 107 may be much smaller.

Rotation of either the inner structure 102 or the outer structure 101 may cause generation of air fluxes within the air gap constituted between the inner structure 102 and the outer structure 101. Furthermore, many wind turbines normally comprise refrigeration systems with the role of cooling the air gap and related elements (e.g. the inner structure 102 and the outer structure 101). These refrigeration systems, which may be based e.g. on fans or other elements such as e.g. water circuits, may be taken into account when defining the properties (cross-section, material . . . ) of the inner and outer coils of the winding arrangements. For example, in a generator with powerful fans inside, the difference of the cross-section and/or the conductivity of the inner coil with respect to the outer coil may be larger than in a wind turbine without such powerful fans.

The gap 108 is one of the zones of the air gap through which the air (from e.g. fans) circulates, so it causes refrigeration of both the outer coil 106c of the first winding arrangement 106 and the outer coil 107c of the second winding arrangement 107. However, this air-based refrigeration does not have any effect on the inner coils 106b, 107b. This lack of refrigeration effect may be compensated through a greater cross-section and/or conductivity of the conductor of each inner coil 106b, 107b with respect to the cross-section and/or conductivity of the conductor of its related outer coil 106c, 107c.

A proper ratio of the cross-section and/or conductivity of the conductor of each inner coil 106b, 107b to the cross-section and/or conductivity of the conductor of its related outer coil 106c, 107c, may improve the thermal behaviour of the winding arrangements 106, 107. This improved thermal behaviour is achieved in terms of obtaining a better equilibrium between the heating of the inner coils 106b, 107b and the outer coils 106c, 107c. Depending on the ratio of the cross-sections and/or conductivity, each inner coil 106b, 107b and its related outer coil 106c, 107c may even reach a substantially equal temperature under most operational conditions.

In embodiments with the conductor of the inner coil 106b, 107b having a larger cross-section than the conductor of the outer coil 106c, 107c, the ratio of the cross-section of the conductor of the outer coil 106b, 107b to the cross-section of the conductor of the inner coil 106c, 107c may e.g. be between 50% and 99%. And, more particularly, said ratio may be between 60% and 75%.

All the considerations commented with respect to the pair of neighbouring winding arrangements 106, 107 of FIG. 1b, are equally of application to any other pair of neighbouring winding arrangements of the inner structure 102 or of the outer structure 101.

FIG. 2a shows an enlarged view of one of the two winding arrangements of FIG. 1b. This figure shows the tooth 107a around which the conductor of the inner coil 107b is wound, and the outer coil 107c whose conductor is wound around the inner coil 107b. In this case, the inner and outer coils have a same number of layers 201 of conductor. Moreover, the conductor of the inner coil 107b and the conductor of the outer coil 107c have a substantially identical height 205 but different width 206, 207. In this embodiment, thus, a larger cross-section of the conductor of the inner coil 107b with respect to the cross-section of the conductor of the outer coil 107c is achieved by attributing a greater width 206 to the cross-section of the conductor of the inner coil 107.

In alternative embodiments, a larger cross-section of the conductor of the inner coil 107b may be achieved by giving a greater height to the cross-section of the conductor of the inner coil 107. However, within the same space, a winding will include less turns (fewer layers). In further alternative embodiments, a larger cross-section of the conductor of the inner coil 107b may be achieved by giving both a greater height and a greater width to the cross-section of the conductor of the inner coil 107.

As commented with respect to FIG. 1b, the goal of attributing a larger cross-section to the conductor of the inner coil 107b is to achieve a smaller electrical resistance per unit length with respect to the outer coil 107c. As also explained before, this goal may be alternatively reached by constructing the inner coil 107b of a material with greater conductivity than the material of the outer coil 107c, or even by a suitable combination of both principles.

FIG. 2a also shows isolation layers 203 between the conductor layers of the inner coil 107b, and isolation layers 204 between the conductor layers of the outer coil 107c. Isolation layers 202 between the inner coil 107b and the outer coil 107c are also depicted. These isolation layers 202-204 have the function of avoiding undesired current transmissions within the inner coil 107b itself and within the outer coil 107c itself, and between the inner coil 107b and the outer coil 107c.

FIG. 2b shows a top view of the winding arrangement of FIG. 2a. This top view has been taken from a point of vision 109 shown in FIG. 1b. The broken lines represent completion of the overall concentric structure of coils, in which the tooth 107a occupies a central position, the inner coil 107b concentrically encloses the tooth 107a, and the outer coil 107c concentrically encloses the inner coil 107b. FIG. 2b also shows a possible line 200-200' according to which the cross-section of the winding arrangement 107 of FIG. 2a could have been obtained.

Figure 3:
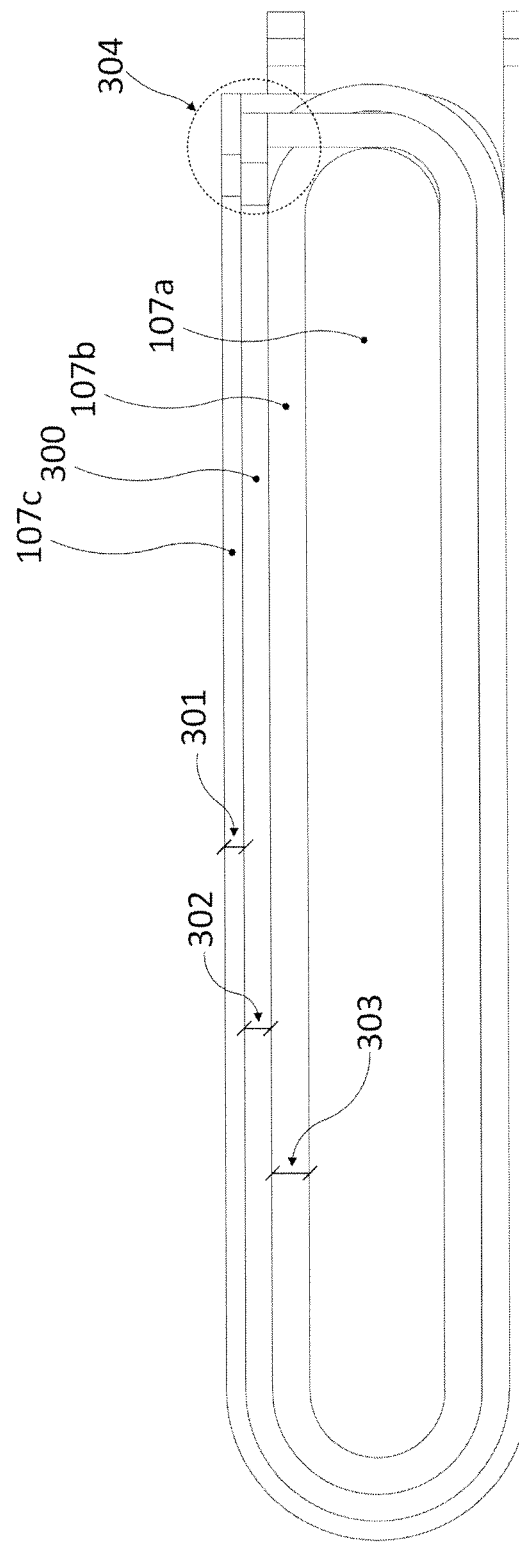
FIG. 3 shows a top view of another winding arrangement according to embodiments of the invention.

FIG. 3 shows a top view of a winding arrangement according to other embodiments of the invention. This top view is very similar to the view shown in FIG. 2b, but in this case the winding arrangement comprises three concentrically arranged windings (or coils) 107b, 300, 107c, with the tooth 107a occupying a central location in this concentric structure. Thus, a difference of this figure with respect to the FIG. 2b is that there is an intermediate coil 300 between the inner coil 107b and the outer coil 107c. Moreover, these three windings 107b, 300, 107c are connected in series through suitable connections 304.

Alternatively to having different coils connected in series, the inner coil 107b, the intermediate coil 300, and the outer coil 107c may be different regions of a single winding constituting the concentric structure of coils. This single winding may be constructed in such a way that the region corresponding to the inner coil 107b may have a greater cross-section than the region corresponding to the outer coil 106c. Furthermore, the construction of the single winding may also take into account the intermediate coil 300 to have a cross-section lying in between the cross-section of the inner coil 107b and the cross-section of the outer coil 107c.

FIG. 3 also shows the width 303 of the conductor of the inner coil 107b which is greater than the width 302 of the conductor of the intermediate coil 300, which is, in turn, greater than the width 301 of the conductor of the outer coil 107c. In other embodiments, several intermediate coils are possible depending on e.g. the design of the generator, the necessary overall number of conductor layers for achieving e.g. determined performance requirements, etc. Thus, a first intermediate coil would concentrically enclose the inner coil 107b, a second intermediate coil would concentrically enclose the first intermediate coil, and so on. In this case, the cross-section of the conductor of each winding enclosing another winding would be smaller than the cross-section of the conductor of the enclosed winding. These relative cross-section relations between conductors of enclosing-enclosed windings will be more detailed in the next paragraph.

Considering the winding arrangement of FIG. 3 for reasons of simplicity, transfer of heat from the inner coil 107b to the intermediate coil 300 and transfer of heat from the intermediate coil 300 to the outer coil 107c may occur during operation of the generator. The outer coil 107c may receive a heat flux from the intermediate coil 300 and similarly, the intermediate coil 300 may receive a heat flux from the inner coil 107b. Only the outer coil may be cooled directly by air, however an improved thermal equilibrium can be achieved by attributing the smallest cross-section 301 to the outer coil 107c, the greatest cross-section 303 to the inner coil 107b, and a cross-section 302 lying in between these 301, 303 for the intermediate coil 300. It will be clear that if even more concentric windings are arranged on the same tooth, a similar method of determining cross-sections may be used.

In the embodiment shown, the width of e.g. the copper sheet conductor is varied, not its thickness. An aspect of this embodiment is that within the same space, a coil with more turns may be used.

Alternatively to having conductors of different cross-sections (with different width and/or thickness), another parameter may be taken into account to achieve the same or similar results. This parameter is the conductivity of the material of the conductors of the coils. Thus, in alternative embodiments, the inner coil 107b may have a greater conductivity than the outer coil 107c, and the intermediate coil 300 may have a conductivity lying in between the conductivity of the inner coil 107b and the conductivity of the outer coil 107c. In further alternative embodiments, suitable combinations of both parameters (cross-section and conductivity) may be taken into account for achieving the same or similar results.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Thus, it is intended that the scope of the present invention herein disclosed should not be limited by the particular disclosed embodiments described before, but should be determined only by a fair reading of the claims that follow.

The invention claimed is:

1. A generator, comprising:
   winding arrangements of the generator, each winding arrangement comprising at least an inner coil and an outer coil,
   wherein the inner coil is constituted by an inner conductor and the outer coil is constituted by an outer conductor,
   wherein the inner conductor is wound around a tooth and the entire outer conductor is wound around the entire inner conductor and the tooth such that a concentric structure of coils is defined by the inner conductor wrapped around the tooth and the outer conductor wrapped around the inner conductor,
   wherein the inner and outer conductors are connected in series, and
   wherein the inner conductor has a constant cross-section and a smaller electrical resistance per unit length than the outer conductor.

2. The generator according to claim 1, wherein the inner conductor has a larger cross-section than the outer conductor.

3. The generator according to claim 2, wherein the cross-section of the inner conductor has a greater height than the cross-section of the outer conductor.

4. The generator according to claim 2, wherein the cross-section of the inner conductor has a greater width than the cross-section of the outer conductor.

5. The generator according to claim 2, wherein the ratio of the cross-section of the outer conductor to the cross-section of the inner conductor is between 50% and 99%.

6. The generator according to claim 5, wherein the ratio of the cross-section of the outer conductor to the cross-section of the inner conductor is between 60% and 75%.

7. The generator according to claim 1, wherein the inner conductor has a greater electrical conductivity than the outer conductor.

8. The generator according to claim 1, wherein each winding arrangement further comprises one or more intermediate coils between the inner and the outer coil in the concentric structure of coils, and wherein each intermediate coil is constituted by an intermediate conductor having an electric resistance per unit length lying in between the electric resistance per unit length of the inner conductor and the electric resistance per unit length of the outer conductor.

9. The generator according to claim 8, wherein each intermediate conductor has a cross-section lying in between the cross-section of the inner conductor and the cross-section of the outer conductor.

10. The generator according to claim 8, wherein each intermediate conductor has an electric conductivity lying in between the electric conductivity of the inner conductor and the electric conductivity of the outer conductor.

11. The generator according to claim 1, comprising a rotor and a stator, wherein the rotor comprises permanent magnets and the stator comprises the winding arrangements with concentric structure of coils.

12. The generator according to claim 3, wherein the cross-section of the inner conductor has a greater width than the cross-section of the outer conductor.

13. The generator according to claim 2, wherein the inner conductor has a greater electrical conductivity than the outer conductor.

14. The generator according to claim 2, wherein each winding arrangement further comprises one or more intermediate coils between the inner and the outer coil in the concentric structure of coils, and wherein each intermediate coil is constituted by an intermediate conductor having a cross-section lying in between the cross-section of the inner conductor and the cross-section of the outer conductor.

15. The generator according to claim 7, wherein each winding arrangement further comprises one or more intermediate coils between the inner and the outer coil in the concentric structure of coils, and wherein each intermediate coil is constituted by an intermediate conductor having an electric conductivity lying in between the electric conductivity of the inner conductor and the electric conductivity of the outer conductor.

16. The generator according to claim 9, wherein each intermediate conductor has an electric conductivity lying in between the electric conductivity of the inner conductor and the electric conductivity of the outer conductor.

17. The generator according to claim 1, wherein the generator is configured for use with a wind or steam turbine.

\* \* \* \* \*